United States Patent [19]
Klasson

[11] 3,794,806
[45] Feb. 26, 1974

[54] PLASMA ARC WELDING TORCH

[75] Inventor: George A. Klasson, Port Washington, N.Y.

[73] Assignee: Air Products and Chemicals, Inc., Allentown, Pa.

[22] Filed: June 24, 1971

[21] Appl. No.: 156,456

Related U.S. Application Data

[62] Division of Ser. No. 831,320, June 9, 1969, Pat. No. 3,632,951.

[52] U.S. Cl................................. 219/121 P, 219/75
[51] Int. Cl................................................. B23k 9/00
[58] Field of Search ........................... 219/121 P, 75

[56] References Cited
UNITED STATES PATENTS

| | | | |
|---|---|---|---|
| 3,553,422 | 1/1971 | McCoy | 219/121 P |
| 2,887,562 | 5/1959 | Mencotti | 219/75 |
| 2,554,236 | 5/1951 | Bernard | 219/75 |
| 2,858,412 | 10/1958 | Kane et al. | 219/121 P |
| 2,890,322 | 6/1959 | Oyler et al. | 219/75 X |
| 3,534,200 | 10/1970 | Wagenleitner et al. | 219/75 |
| 3,304,402 | 2/1967 | Thorpe | 219/121 P |

*Primary Examiner*—Bruce A. Reynolds
*Attorney, Agent, or Firm*—Barry Moyerman; Ronald B. Sherer

[57] ABSTRACT

Disclosed is a plasma arc welding torch suitable for welding materials of construction. The torch is characterized in that the head is divided into two sections, each section carrying a different electrical potential, the sections separated by a combination electrical insulator and sealing member. There is further provided a collar for electrically insulating the torch tip from the nozzle and at the same time serving to aid in dissipating heat generated at the tip.

4 Claims, 5 Drawing Figures

PATENTED FEB 26 1974　　3,794,806

PLASMA ARC WELDING TORCH

CROSS-REFERENCE TO RELATED APPLICATION

This application is a divisional application of copending Ser. No. 831,320 filed June 9, 1969 now U.S. Pat. No. 3,632,951.

BACKGROUND OF THE INVENTION

This invention pertains to plasma arc welding torches and in particular to a welding torch suitable for developing a plasma arc with welding currents of less than 100 amperes.

The prior art low current plasma arc torches are exemplified by the torch disclosed in U. S. Pat. No. 3,429,215 which is useable for welding thin sections. The patentees show a process for generating a plasma and stabilizing the plasma arc along its serial path by using a shielding gas. Without the shielding gas, the arc is considered unstable and not useable for welding.

SUMMARY OF THE INVENTION

The present invention discloses a torch construction wherein the plasma arc generated is inherently stable. The stability of the plasma arc is achieved without the necessity for the shielding gas as disclosed in the above cited patent. The torch of the present invention is characterized in that the major portions of the torch head carrying different potentials are connected by a ceramic connector bonded to sections of the torch head. Furthermore, there is provided a collar for aiding in dissipating heat from that portion of the torch tip that is not water cooled.

Therefore, it is the primary object of this invention to provide an improved plasma arc torch capable of stable operation at low current levels.

It is another object of the invention to provide a torch with novel electrical insulating means between the portions of the torch carrying different electrical potentials.

It is still another object of this invention to provide improved means for dissipating heat from the non-water cooled portions of the torch.

BRIEF DESCRIPTION OF THE DRAWINGS

FIG. No. 1 is a cross-sectional view of a torch according to one embodiment of the present invention.

DESCRIPTION OF THE PREFERRED EMBODIMENT

Figure 1:
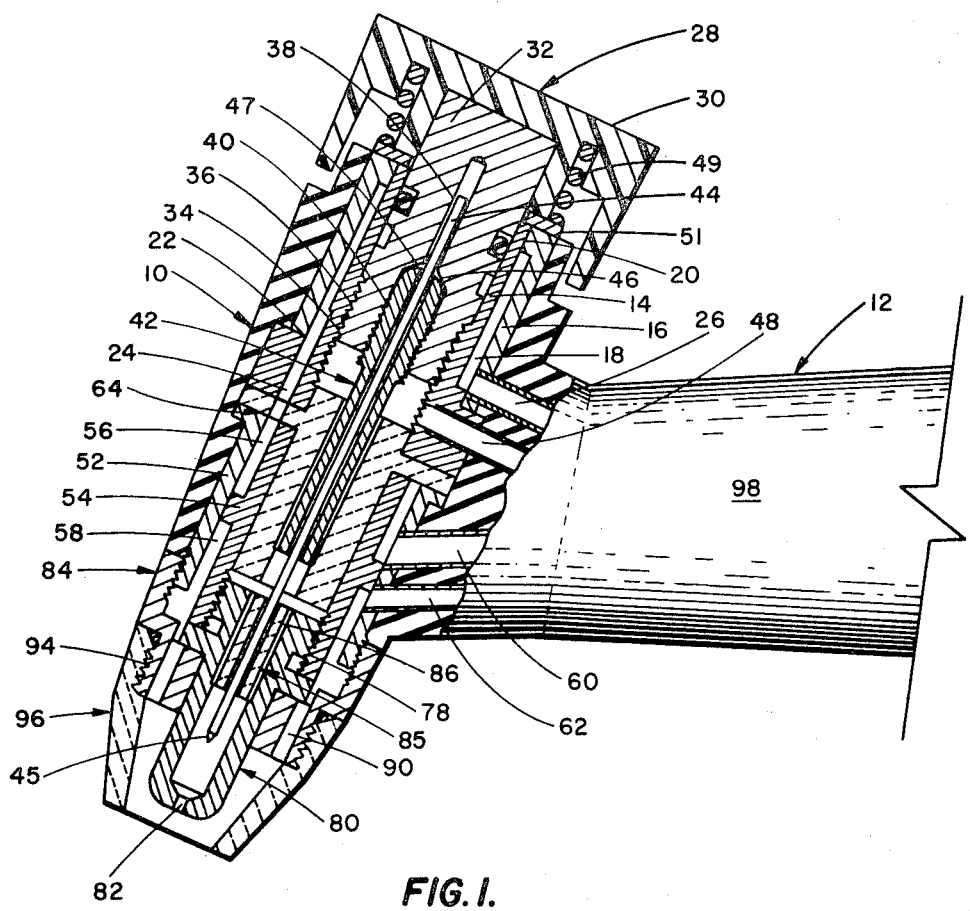

Referring to the drawing and in particular to FIG. 1, there is shown a welding torch comprising a head shown generally as 10 and a handle shown generally as 12.

The head comprises an upper body assembly consisting of members 14 and 16 which are in the general shape of concentric sleeves to define an annular passage 18. The members 14 and 16 are fabricated from a material such as copper and joined together as by brazing at annular surfaces 20 and 22. The sleeve 14 contains on one side a passage shown as 24. Disposed within the wall of sleeve 16 is a conduit 26 communicating with annular passage 18. Sleeve 14 is provided with a conduit 48 for admitting arc gas to the torch head 10.

The upper body assembly includes a back cap assembly shown generally as 28. The back cap assembly 28 has a cover 30 and disposed within the cover 30 is a central stem 32. The stem 32 can be fastened to cover 30 by press-fitting or other suitable techniques. Stem 32 contains a lower threaded portion 34, the threads being complementary to matching threads 36 provided on the interior surface of sleeve 14.

Stem 32 also includes a central bore 38 in the form of a stepped cylinder with a conical transition zone 47 between the different diameters of bore 38. The larger diameter portion of stepped cylindrical bore 38 contains a threaded portion 40 for threadably receiving electrode chuck 42. Electrode chuck 42 is provided with a central bore to receive welding electrode 44. The chuck 42 contains an upper portion 46 which is provided with a threaded portion to be threaded within the larger diameter of stepped cylindrical bore 38. The upper portion of chuck 42 is provided with slots (not shown) to grip the electrode 44 as the chuck 42 is inserted into the stepped cylindrical bore 38 and the rounded end 46 thereof is forced against the cone-shaped surface 47 between the larger and smaller diameters of stepped cylindrical bore 38. As shown in the drawing, the electrode 44 is then held firmly by the compressing of the end 46 of the chuck 42 as in an ordinary spring collet. The threaded portion of stem 32 allows movement of the back cap assembly 28 and hence electrode 44 toward and away from the tip 80 to aid in initiating the arc as is known in the art. To aid in the smooth movement of the electrode biasing means, such as spring 49, is disposed between cover 30 and the upper body assembly. An annular washer 51 made from a low friction material such as poly(tetrafluorethylene) is disposed between the bottom of spring 49 and the upper body assembly to prevent wear.

The torch head 10 further includes a lower body assembly consisting of sleeves 52 and 54. The sleeves 52 and 54 are generally cylindrical and define annular passages 56 and 58. Disposed within the wall of sleeve 52 and communicating with passage 56 is a conduit 60. Also disposed within the wall of sleeve 52 and communicating with passage 58 is conduit 62.

Figures 3A, 3B:
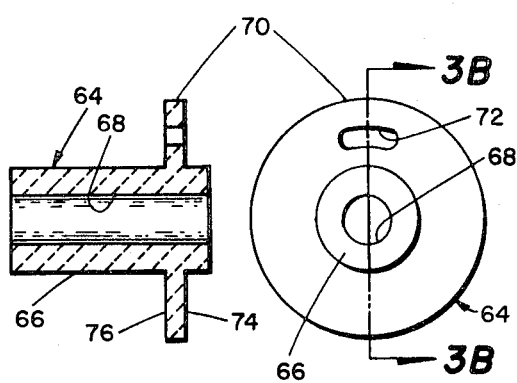
FIG. 3A is a top view of the insulating member according to the present invention.
FIG. 3B is a cross-sectional view of the insulating member according to the present invention taken along lines 3B—3B of FIG. 3A.

Separating the upper body assembly from the lower body assembly is insulating member 64 shown in more detail in FIGS. 3A and 3B. Insulating member 64 consists of a generally cylindrical body 66 containing a central passage 68 and a flange 70 surrounding a cylindrical portion 66. The flange 70 includes a passage 72. The insulating member 64 is preferably manufactured from a ceramic material such as alumina or beryllia. The ceramic is then provided with a metalized coating on all major surfaces. These include the flat surfaces 74 and 76 of the flange 70 and the outside surface of cylindrical body 66. The outside diameter of body 66 is generally equal to the inside diameter of sleeves 14 and 54. The insulator 64 is assembled with the major portion of the body 66 inside the lower body assembly and the minor portion of the body inside the upper body assembly with passage 72 communicating with passage 24 and passage 56. After assembly the insulator is brazed to both the upper and lower body assemblies by well known techniques. This structure then assures electrical insulation between the upper and lower body assembly and also prevents fluid leakage from the cooling passages as will be hereinafter more fully described.

The lower inside surface of sleeve 54 is threaded to receive complementary threads 78 of the tip shown generally as 80. Tip 80 includes an orifice 82 for focusing the plasma arc. The tip 80 is made from a conducting material, normally copper. Disposed within the upper portion of tip 80 is an electrode spacer 85. The spacer 85 is in the form of a cylinder made of a ceramic material, such as alumina or boron nitride, with grooves on the outside surface 86 to allow arc gas to flow toward the lower end 45 of electrode 44.

Figures 2A, 2B:
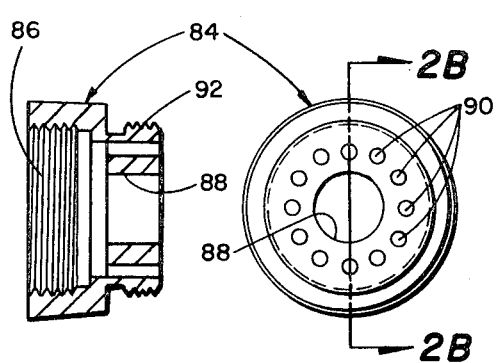
FIG. 2A is a bottom view of the heat dissipating collar according to the present invention.
FIG. 2B is a cross-sectional view of the heat dissipating collar according to the present invention taken along line 2B—2B of FIG. 2A.

Disposed around a portion of the tip 80 is a collar 84 shown in more detail in FIGS. 2A and 2B. The collar is provided with an upper thread portion 86 for attaching to the lower portion of sleeve 52 which is provided with complimentary threads. The lower portion of collar 84 contains a central bore 88 having a diameter equal to the outside diameter of the tip 80. Disposed around central bore 88 is a plurality of passages 90 which communicate with annular passage 58, which in turn communicates with conduit 62 for admitting shielding gas to the torch.

Collar 84 is preferably made of aluminum with an anodized coating. The aluminum produces rapid conduction of heat away from the tip 84 and at the same time the anodized coating acts to electrically insulate the torch collar if it accidentally touches against a metal object.

Around the lower portion of the collar 84 there is provided a series of threads 92 for receiving complimentary threads 94 of nozzle 96. The nozzle 96 serves to direct the shielding gas around the plasma arc. The nozzle 96 is preferably made of a ceramic material to prevent electrical conduction from the tip to metal objects accidentally touched by the torch.

The conduits 26, 48, 60 and 62, and the exposed portions of the upper and lower body assemblies are covered with an insulating material such as silicone rubber to complete the torch head 10 and handle 12.

In operation, water is admitted to conduit 60 and then circulates from annular passage 56 to passage 72 to passage 24 into annular passage 18 and out through conduit 26 for cooling the torch.

Arc gas is admitted through conduit 48 down along the lower end of chuck 42 to the lower end 45 of the electrode for establishing the plasma arc.

Electrically the upper body assembly is connected to the negative terminal of a source of electrical energy through conduits 56 and 48 and the lower body assembly is connected to the positive terminal of a source of electrical energy through conduits 60 and 62. The insulator 64, being a ceramic, insulates the upper and lower body assemblies. The same insulator 64, because it is bonded to the upper and lower body assemblies, serves to prevent water leakage from the water passages into the gas streams, therefore, insulator 64 has a dual function.

Collar 84 being constructed of aluminum aids in dissipating heat from the torch tip 80. At the same time, since the collar 84 is provided with an anodized coating, the collar is insulating to electrical energy and protects the torch from accidental short circuits if it is touched to a conductor.

It has also been shown that by having tip 80 up inside nozzle 96, as shown in FIG. 1, this tends to eliminate tip metal inclusions in the weld metal. Having the tip 80 retracted also prevents short circuits since the tip cannot touch the work directly and the surrounding nozzle 96 is constructed of an electrically insulating material.

Having thus described our invention by what is considered a preferred embodiment, we wish it understood it may be embodied in other forms without departing from the spirit and scope of the appended claims.

We claim:

1. In a water cooled plasma arc welding torch suitable for developing a plasma arc with welding current of up to 100 amperes of the type wherein there is provided a tip for issuing a collimated plasma arc, said tip normally carrying an electrical potential the improvement which comprises:
   a collar surrounding and contacting a portion of the tip, the collar including a plurality of shielding gas passages disposed in axial relations to the tip for surrounding the tip with a sheath of shielding gas, the collar being insulating to electrical energy and conductive to thermal energy; thereby eliminating a water jacket surrounding the tip.

2. A collar according to claim 1 constructed of aluminum coated on all surfaces with aluminum oxide.

3. A plasma arc welding torch suitable for developing a plasma arc with welding current of up to 100 amperes comprising:
   a torch body having an upper body assembly and a lower body assembly each containing a coaxial central passage;
   means in the upper and lower body assemblies for defining fluid passages for cooling at least part of the torch body;
   means in the torch body for admitting arc gas to the central passage;
   an electrically insulating member separating the upper and lower assemblies of the body said member including a central aperture coaxial with the central passage of the upper and lower body assemblies;
   a tip having a central passage therethrough and held by the lower body assembly in coaxial relation thereto the tip having a projection end with an arc focusing orifice;
   a cap surrounding part of the upper body assembly, said cap including a sleeve disposed within the central passage of the upper body assembly, a chuck carried by the sleeve for holding an electrode held by the chuck and projecting therefrom through the lower body assembly into the central passage in the tip;
   a nozzle surrounding and projecting beyond the tip thereby defining a passage for shielding gas to surround the tip;
   means associated with said cap to provide ready movement of said electrode toward said tip to initiate an arc; and
   means for admitting shielding gas to the passage defined by the nozzle and the tip.

4. A plasma arc welding torch suitable for developing a plasma arc with welding current up to 100 amperes comprising:

a torch body having an upper body assembly and a lower body assembly, each containing coaxial central passages;

means in the upper and lower body assemblies for defining fluid passages for cooling at least part of the torch body;

means in the torch body for admitting arc gas to the central passages;

an electrically insulating member separating the upper and lower portions of the head, said member including a central passage coaxial with the central passage of the upper and lower body assemblies;

a cap surrounding part of the upper body assembly including a sleeve disposed within the central passage of the upper head portion, a chuck carried by the sleeve for holding an electrode within the central passage, and an electrode held by the chuck and projecting therefrom into the lower body assembly;

a tip surrounding the projecting end of the electrode, the tip including means for focusing the plasma arc;

a collar surrounding a portion of the tip, the collar being insulating to electrical energy and conductive to thermal energy;

a nozzle surrounding the tip and defining a passage for shielding gas to surround the tip; and means for admitting shielding gas to the passage defined by the nozzle and the tip.

* * * * *